United States Patent
Oguro et al.

(10) Patent No.: US 10,593,949 B2
(45) Date of Patent: Mar. 17, 2020

(54) ELECTRODE FOR LITHIUM ION SECONDARY BATTERY-USE

(71) Applicant: ZEON CORPORATION, Chiyoda-ku, Tokyo (JP)

(72) Inventors: Hiroki Oguro, Tokyo (JP); Kouichirou Maeda, Tokyo (JP); Naoki Takahashi, Tokyo (JP)

(73) Assignee: Zeon Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/775,103

(22) PCT Filed: Nov. 9, 2016

(86) PCT No.: PCT/JP2016/004842
§ 371 (c)(1),
(2) Date: May 10, 2018

(87) PCT Pub. No.: WO2017/085919
PCT Pub. Date: May 26, 2017

(65) Prior Publication Data
US 2018/0358625 A1  Dec. 13, 2018

(30) Foreign Application Priority Data
Nov. 19, 2015  (JP) ................................. 2015-226368

(51) Int. Cl.
*H01M 4/62* (2006.01)
*H01M 4/13* (2010.01)
*H01M 2/16* (2006.01)
*H01M 10/0525* (2010.01)

(52) U.S. Cl.
CPC ............ *H01M 4/622* (2013.01); *H01M 2/16* (2013.01); *H01M 2/168* (2013.01); *H01M 2/1686* (2013.01); *H01M 4/13* (2013.01); *H01M 10/0525* (2013.01); *C08L 2205/025* (2013.01); *C08L 2207/53* (2013.01)

(58) Field of Classification Search
CPC .... H01M 4/13; H01M 4/622; H01M 10/0525; H01M 2/1686; H01M 2/16; H01M 2/168; C08L 2205/025; C08L 2207/53
USPC ......................................................... 429/217
See application file for complete search history.

(56) References Cited

U.S. PATENT DOCUMENTS

| | | | |
|---|---|---|---|
| 9,005,807 B2 | 4/2015 | Honda | |
| 2014/0239239 A1* | 8/2014 | Cha ........................ | H01M 4/622 252/519.33 |
| 2016/0036055 A1 | 2/2016 | Yamamoto | |
| 2016/0141575 A1* | 5/2016 | Sasaki ................. | H01M 2/1653 429/144 |
| 2016/0141581 A1* | 5/2016 | Sasaki ............... | H01M 10/0525 429/144 |
| 2016/0218356 A1* | 7/2016 | Paulsen ................... | B60L 58/40 |
| 2016/0268565 A1* | 9/2016 | Sasaki ................... | H01M 4/622 |
| 2017/0338486 A1* | 11/2017 | Kawakita .............. | H01M 4/525 |
| 2018/0040899 A1* | 2/2018 | Kuzuoka ................ | H01M 4/13 |
| 2018/0055963 A1* | 3/2018 | Richardson ............... | A61L 2/20 |
| 2018/0057678 A1* | 3/2018 | Nagai ..................... | C08L 33/20 |
| 2018/0062165 A1* | 3/2018 | Oono ................... | H01M 4/0471 |
| 2018/0261815 A1* | 9/2018 | Ikemi .................... | H01M 4/622 |

FOREIGN PATENT DOCUMENTS

| | | |
|---|---|---|
| JP | 2009026674 A | 2/2009 |
| JP | 4929540 B2 | 5/2012 |
| JP | 5177301 B2 | 4/2013 |
| WO | 2014148064 A1 | 9/2014 |

OTHER PUBLICATIONS

Feb. 28, 2019, the Extended European Search Report issued by the European Patent Office in the corresponding European Patent Application No. 16865923.3.
Encyclopedia of Experimental Chemistry 28, Fourth Edition, Polymer Synthesis, Edited by the Chemical Society of Japan, May 6, 1992, p. 49, I. 20-p. 51, I. 7, vol. 28, Maruzen.
May 22, 2018, International Preliminary Report on Patentability issued in the International Patent Application No. PCT/JP2016/004842.

* cited by examiner

*Primary Examiner* — Amanda C. Walke
(74) *Attorney, Agent, or Firm* — Kenja IP Law PC

(57) ABSTRACT

It is an object of the present disclosure to provide an electrode for lithium ion secondary battery-use that can efficiently prevent a temperature increase by reducing current through an increase in the battery internal resistance during abnormal overheating. The electrode for lithium ion secondary battery-use of the present disclosure comprises a binder composition containing particles formed by a second component being located substantially on a portion of the outside of particles comprising a first component. The initial adhesive force of the binder composition is at least 1. The storage elastic modulus of the binder composition at 150° C. is no greater than 1,000 Pa.

5 Claims, No Drawings

ELECTRODE FOR LITHIUM ION SECONDARY BATTERY-USE

TECHNICAL FIELD

The present disclosure relates to an electrode for lithium ion secondary battery-use.

BACKGROUND

Lithium ion secondary batteries are small and light, high in energy density, and capable of repeated charging and discharging. For environmental reasons as well, the demand for such lithium ion secondary batteries is expected to increase. These high energy-density lithium ion secondary batteries are used in fields such as mobile phones and notebook computers, but with the expansion and development of applications for these batteries, even better performance is required, such as lower resistance and higher capacity.

A separator fulfills an important function for preventing an electric short circuit between the positive electrode and the negative electrode of a lithium ion secondary battery. A fine porous membrane made of polyolefinic resin, for example, is typically used as the separator of a lithium ion secondary battery. The separator also normally has the role of maintaining the safety of the lithium ion secondary battery by fusing when the battery reaches a high internal temperature near 130° C., for example, and blocking the fine pores to prevent transfer of lithium ions, thereby achieving a shutdown function to shut off the current. If, however, instantaneous heat generation causes the battery temperature to further exceed the melting point of the resin forming the separator, then the separator may suddenly contract, and a location where the positive electrode and negative electrode come in direct contact and short-circuit may expand. In this case, the battery temperature may rise to several hundred ° C. or higher, and the battery may reach a state of abnormal overheating.

To inhibit a temperature increase during abnormal overheating, use of heat expandable microcapsules has been proposed. Patent literature (PTL) 1 discloses a current collector that includes a resin layer and a conductive adhesive layer. Heat expandable microcapsules formed by enclosing expandable material in a shell that contains a thermoplastic polymer material are used in the adhesive layer. PTL 2 discloses dispersing, in an electrode active material layer, heat expandable microcapsules formed by enclosing a low-boiling hydrocarbon in a copolymer shell. PTL 3 discloses adding, to an electrolysis solution, heat expandable microcapsules in which a low-boiling hydrocarbon or a foaming agent is polymerized in situ in a thermoplastic resin, such as vinylidene chloride or acrylonitrile.

CITATION LIST

Patent Literature

PTL 1: JP 5177301 B2
PTL 2: JP 4929540 B2
PTL 3: JP 2009-26674 A

SUMMARY

Technical Problem

In the heat expandable microcapsules disclosed in PTL 1 to 3, however, the inside material needs to be covered by an outside (shell) material, and to cover the inside material completely, a sufficient amount of outside material needs to be used. Moreover, PTL 1 and PTL 2 are inefficient, for example in that a special current collector needs to be produced to inhibit a temperature increase during abnormal overheating in PTL 1, and a binder needs to be used in addition to the heat expandable microcapsules when forming the electrode active material layer in PTL 2.

It is therefore an object of the present disclosure to provide an electrode for lithium ion secondary battery-use that can efficiently prevent a temperature increase by reducing current through an increase in the battery internal resistance during abnormal overheating.

Solution to Problem

As a result of intense study, we discovered that the aforementioned object can be achieved by using a binder composition containing predetermined particles, thereby completing the present disclosure.

Specifically, the present disclosure provides the following.

(1) An electrode for lithium ion secondary battery-use comprising: a binder composition containing particles formed by a second component being located substantially on a portion of an outside of particles comprising a first component; wherein an initial adhesive force of the binder composition is at least 1, and a storage elastic modulus of the binder composition at 150° C. is no greater than 1,000 Pa.
(2) The electrode for lithium ion secondary battery-use of (1), wherein a glass-transition temperature of the second component is at least −60° C. and no higher than 20° C.
(3) The electrode for lithium ion secondary battery-use of (1) or (2), wherein a melting point of the first component is at least 60° C. and no higher than 160° C.
(4) The electrode for lithium ion secondary battery-use of any one of (1) to (3), wherein the first component contains a polyolefin with a number-average molecular weight of at least 5,000 and no greater than 15,000.
(5) A lithium ion secondary battery comprising: a positive electrode, a negative electrode, a separator, and an electrolysis solution; wherein either or both of the positive electrode and the negative electrode are the electrode for lithium ion secondary battery-use of any one of (1) to (4).

Advantageous Effect

The electrode for lithium ion secondary battery-use of the present disclosure can efficiently prevent a temperature increase by reducing current through an increase in the battery internal resistance during abnormal overheating.

DETAILED DESCRIPTION

The electrode for lithium ion secondary battery-use of the present disclosure is described below. The electrode for lithium ion secondary battery-use of the present disclosure comprises a binder composition containing particles formed by a second component being located substantially on a portion of the outside of particles comprising a first component. The initial adhesive force of the binder composition is at least 1. The storage elastic modulus of the binder composition at 150° C. is no greater than 1,000 Pa.

(Binder Composition)

The binder composition used in the present disclosure contains particles (hereinafter also "binder particles") formed by the second component being located substantially on a portion of the outside of particles comprising the first component. The binder composition may include components other than the binder particles but preferably consists only of the binder particles.

(Binder Particles)

The binder particles are formed by the second component being located substantially on a portion of the outside of particles comprising the first component. Here, "formed by . . . being located substantially on a portion" refers to particles comprising the first component not being completely covered by the second component, so that the first component and the second component are exposed on the surface of the binder particles. Examples of such a structure include a snowman structure, in which a portion at the center (particle comprising the first component) in a core-shell structure is exposed at the outer shell (second component), the core-shell structure being formed by a spherical particle in which the center (particle comprising the first component) and the outer shell (second component) are formed from different polymers; an ocellated octopus structure in which a different type of particle (second component) is embedded in the surface of a spherical particle (particle comprising the first component), yielding an integrated structure; and the like. The binder particles may be formed by further combining two or more of the aforementioned heterophase structures into one composite particle.

It suffices for at least the surface layer of the particles comprising the first component to be formed by the first component. In other words, the particles comprising the first component may be formed only by the first component or may contain another component different from the first component on the inside of the surface layer formed by the first component.

(Particles Comprising First Component)

The first component in the particles comprising the first component preferably melts during abnormal overheating of the lithium ion secondary battery and preferably has a viscosity at the time of melting in a predetermined range. Among such first components, a polymer such as a polyolefin is particularly preferably used.

Here, the polyolefin is a polymer having a repeating unit (monomer unit) derived from an unsaturated hydrocarbon with at least one carbon double bond inside the molecule. Examples of the polyolefin include high-density polyethylene, low-density polyethylene, polypropylene (PP), polybutene, polybutadiene, a butadiene-isoprene copolymer, polyisoprene, an ethylene-vinyl acetate copolymer (EVA), an ethylene-ethyl acrylate copolymer, an ethylene-propylene copolymer (EPR), an ethylene-propylene-diene terpolymer, and a styrene-butadiene block copolymer hydride (SEB). Any one of these or a combination of any two or more may be used. A polyolefin derivative such as chlorinated polyolefin may be used as the polyolefin. Polyolefin wax may also be used as the polyolefin. Furthermore, the proportion of the repeating unit (monomer unit), which is derived from an unsaturated hydrocarbon with at least one carbon double bond inside the molecule, included in the polyolefin is preferably at least 70 mass %.

To achieve an excellent balance between the melting point and the viscosity at the time of melting and to obtain a sufficient increase in the internal resistance of the lithium ion secondary battery at the time of melting, the molecular weight of the polyolefin is preferably at least 5,000, more preferably at least 6,000, even more preferably at least 7,000, and preferably no greater than 15,000, more preferably no greater than 12,000, and even more preferably no greater than 10,000. Setting the molecular weight of the polyolefin to be no greater than the upper limit of the aforementioned range allows the suppression of a phenomenon whereby the internal resistance cannot be sufficiently increased due to the melted polyolefin not easily expanding because of a rise in viscosity at the time of melting. Setting the molecular weight of the polyolefin to be at least the lower limit of the aforementioned range can also prevent the melting point of the polyolefin from becoming excessively low. It is therefore possible to suppress a phenomenon whereby the internal resistance increases and battery performance significantly degrades due to melting of the polyolefin even in a normal, non-overheated state.

To prevent a temperature increase by reducing current through an increase in the battery internal resistance by melting during abnormal overheating, the melting point of the first component is preferably at least 60° C., more preferably at least 80° C., and is preferably no higher than 160° C., more preferably no higher than 140° C. Setting the melting point of the first component within the aforementioned range allows the suppression of a phenomenon whereby the separator undergoes thermal contraction before the first component melts because of an excessively high melting point, leading to a short circuit and a sudden increase in temperature. It is also possible to suppress a phenomenon whereby the internal resistance increases due to melting of the first component and battery performance significantly degrades even in a normal, non-overheated state because of the melting point being excessively low.

Known additives (antioxidants) added to polymers such as a polyolefin may be further included in the particles comprising the first component.

(Second Component)

The second component located substantially on a portion of the outside of the particles comprising the first component is not specifically limited apart from being able to provide the binder particles with a binding force, but a polymer such as an acrylic-based polymer is preferably used.

The second component typically has a different composition than the first component.

The acrylic-based polymer is a polymer that includes a monomer unit formed by polymerizing a (meth)acrylic acid ester compound. Examples of the acrylic-based polymer include a homopolymer of a (meth)acrylic acid ester compound and a copolymer of a (meth)acrylic acid ester compound and a monomer copolymerizable with a (meth)acrylic acid ester compound. The binding capacity of the binder particles can be increased by using a polymer of a (meth)acrylic acid ester compound. In the present disclosure, "(meth)acryl" is used to indicate "acryl" or "methacryl".

Examples of the (meth)acrylic acid ester compound include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, nonyl acrylate, decyl acrylate, lauryl acrylate, n-tetradecyl acrylate, stearyl acrylate, and 2-ethylhexyl acrylate; alkoxyalkyl acrylate esters such as 2-methoxyethyl acrylate and 2-ethoxyethyl acrylate; 2-(perfluoroalkyl)ethyl acrylates such as 2-(perfluorobutyl)ethyl acrylate and 2-(perfluoropentyl)ethyl acrylate; methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, nonyl methacrylate, decyl methacrylate, lauryl methacrylate, tridecyl methacrylate, n-tetradecyl methacrylate, stearyl methacrylate, and 2-ethylhexyl methacrylate; alkoxyalkyl methacrylate esters such as 2-methoxyethyl methacrylate and 2-ethoxyethyl methacrylate; 2-(perfluoroalkyl) ethyl methacrylates such as 2-(perfluorobutyl)ethyl methacrylate and 2-(perfluoropentyl)ethyl methacrylate; benzyl acrylate; benzyl methacrylate; and the like. Among these, the (meth)acrylic acid ester compound used in the preparation of the acrylic-based polymer preferably includes at least one of 2-ethylhexyl acrylate, n-butyl acrylate, and t-butyl acrylate. One type of the (meth)acrylic acid ester compound may be used alone, or two or more types may be used in combination in any ratio.

The proportion of the monomer unit, included in the second component, formed by polymerizing the (meth)acrylic acid ester compound (hereinafter also "(meth)acrylic acid ester monomer unit") is preferably at least 40 mass %, more preferably at least 50 mass %, and particularly preferably at least 60 mass %, and is preferably no greater than 95 mass %, more preferably no greater than 90 mass %, and particularly preferably no greater than 85 mass %. As a result of the proportion constituted by the (meth)acrylic acid ester monomer unit being at least the lower limit of the aforementioned range, the binding capacity between the binder particles and the active material or the current collector can be further improved. As a result of the proportion constituted by the (meth)acrylic acid ester monomer unit being no greater than the upper limit of the aforementioned range, a binder composition with excellent stability can be obtained.

Examples of monomers that are copolymerizable with the (meth)acrylic acid ester compound include unsaturated carboxylic acids such as acrylic acid, methacrylic acid, itaconic acid, and fumaric acid; carboxylic acid esters that have two or more carbon-carbon double bonds, such as ethylene glycol dimethacrylate, diethylene glycol dimethacrylate, and trimethylolpropane triacrylate; styrene-based monomers such as styrene, chlorostyrene, vinyltoluene, t-butyl styrene, vinylbenzoate, methyl vinylbenzoate, vinylnaphthalene, chloromethylstyrene, hydroxymethylstyrene, α-methylstyrene, and divinyl benzene; amide-based monomers such as acrylamide, N-methylol acrylamide, and acrylamide-2-methylpropane sulfonic acid; α,β-unsaturated nitrile compound monomers such as acrylonitrile and methacrylonitrile; olefins having one carbon double bond, such as ethylene and propylene; diene monomers such as butadiene and isoprene; halogen atom-containing monomers such as vinyl chloride and vinylidene chloride; vinyl esters such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; heterocycle-containing vinyl compounds such as N-vinylpyrrolidone, vinylpyridine, and vinylimidazole; and glycidyl group-containing monomers such as glycidyl acrylate, glycidyl methacrylate, and allyl glycidyl ether. A plurality of these types may be used together as the copolymerizable monomers.

The second component may include a reactive surfactant unit. The reactive surfactant unit is a structural unit that has a structure formed by polymerizing a reactive surfactant. The reactive surfactant unit can form a portion of the second component and also function as a surfactant.

The reactive surfactant is a monomer containing a polymerizable group that can copolymerize with another monomer and also containing a surfactant group (hydrophilic group and hydrophobic group). Normally, a reactive surfactant contains a polymerizable unsaturated group, and after polymerization, this group also functions as a hydrophobic group. Examples of the polymerizable unsaturated group contained in the reactive surfactant include a vinyl group, an allyl group, a vinylidene group, a propenyl group, an isopropenyl group, and an isobutylidene group. One type of polymerizable unsaturated group may be used alone, or two or more types may be used in combination in any ratio.

The reactive surfactant normally contains a hydrophilic group as a portion that expresses hydrophilicity. Depending on the type of hydrophilic group, reactive surfactants are classified into anionic, cationic, and non-ionic surfactants.

Examples of anionic hydrophilic groups include —SO$_3$M, —COOM, and —PO(OH)$_2$. Here, M indicates a hydrogen atom or a cation. Examples of the cation include alkali metal ions such as lithium, sodium, and potassium; alkaline earth metal ions such as calcium and magnesium; ammonium ions; ammonium ions of alkylamine such as monomethylamine, dimethylamine, monoethylamine, and triethylamine; and ammonium ions of alkanolamine such as monoethanolamine, diethanolamine, and triethanolamine.

Examples of cation-based hydrophilic groups include primary amine salts such as —NH$_2$HX, secondary amine salts such as —NHCH$_3$HX, tertiary amine salts such as —N(CH$_3$)$_2$HX, and quaternary amine salts such as —N$^+$(CH$_3$)$_3$X$^-$. Here, X represents a halogen group.

Examples of non-ionic hydrophilic groups include —OH.

Examples of preferable reactive surfactants include compounds represented by Formula (I) below.

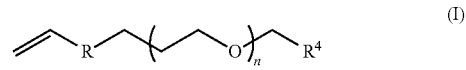

(I)

In Formula (I), R represents a divalent linking group. Examples of R include a —Si—O— group, methylene group, and phenylene group.

In Formula (I), R$^4$ represents a hydrophilic group. Examples of R$^4$ include —SO$_3$NH$_4$.

In Formula (I), n represents an integer from 1 to 100.

Other examples of preferred reactive surfactants include a compound that contains a structural unit having a structure formed by polymerizing ethylene oxide and a structural unit having a structure formed by polymerizing butylene oxide and also contains, at the end, an alkenyl group and —SO$_3$NH$_4$ having a terminal double bond (for example, polyoxyalkylene alkenyl ether ammonium sulfate; product names: "LATEMUL PD-104" and "LATEMUL PD-105", produced by Kao Corporation).

One type of reactive surfactant and reactive surfactant unit may be used alone, or two or more types may be used in combination in any ratio.

The proportion of reactive surfactant unit contained in the second component is preferably at least 0.1 mass %, more preferably at least 0.2 mass %, and particularly preferably at least 0.5 mass %, and is preferably no greater than 5 mass %, more preferably no greater than 4 mass %, and particularly preferably no greater than 2 mass %.

To obtain a binder composition with sufficient binding capacity, the glass-transition temperature of the second component is preferably at least −60° C., more preferably at least −55° C., and even more preferably at least −50° C., and is preferably no higher than 20° C., more preferably no higher than 15° C., even more preferably no higher than 10° C., and most preferably no higher than −30° C. Setting the glass-transition temperature of the second component within the aforementioned range can prevent the binding capacity of the binder composition from becoming insufficient.

The second component preferably maintains its binding capacity as a binder when the first component has melted.

(Structure of Binder Particles)

The binder particles can, for example, be obtained by (co)polymerizing a monomer leading to the second component in the presence of particles comprising the first component. The method for copolymerizing a monomer leading to the second component in the presence of particles comprising the first component is not specifically limited, but a method for emulsion polymerization of a monomer leading to the second component in an aqueous dispersion of particles comprising the first component is preferred. With this method, particles (binder particles) in which the second component is located substantially on a portion of the outside of particles comprising the first component can be obtained. "(Co)polymerization" refers to polymerization or copolymerization. Furthermore, the particles comprising the first component are not specifically limited and can, for example, be prepared by mixing the first component, a dispersion medium, and a surfactant at a temperature of at least the melting point of the first component and subsequently cooling in a state of dispersion by a disperser.

Any of a batch process, a semi-continuous process, or a continuous process may be used as the polymerization method. The polymerization pressure, polymerization temperature, and polymerization time are not specifically limited, and known conditions can be adopted.

Emulsion polymerization is normally carried out with common procedures. For example, emulsion polymerization is carried out with the method described in "Experimental Chemistry", vol. 28 (publisher: Maruzen Co. Ltd., edited by the Chemical Society of Japan). Namely, in this method, water, additives such as a dispersant, emulsifier, crosslinking agent, and the like, a polymerization initiator, and a monomer solution are added to an airtight container with a stirrer and a heating device to yield a predetermined composition. The composition in the container is stirred to emulsify the monomer and the like in the water, and polymerization is started by raising the temperature while stirring. An alternative method is to place the aforementioned composition in an airtight container after emulsification and then start the reaction similarly. In the emulsion polymerization, the various additives that are typically used in an emulsion polymerization reaction, such as a surfactant, polymerization initiator, chain transfer agent, chelating agent, electrolyte, oxygen scavenger, and the like can be used as secondary material for polymerization.

Any surfactant can be used in the emulsion polymerization as long as the desired binder particles can be obtained. Examples of the surfactant include sodium dodecylbenzenesulfonate, sodium lauryl sulfate, sodium dodecyl diphenyl ether disulfonate, sodium succinate dialkyl ester sulfonate, and the like. One type of surfactant may be used alone, or two or more types may be used in combination in any ratio.

Any amount of surfactant may be used as long as the desired binder particles are obtained, but per 100 parts by mass of the monomer leading to the second component, the amount of surfactant is preferably at least 0.5 parts by mass, more preferably at least 1 part by mass, and preferably no greater than 10 parts by mass, more preferably no greater than 5 parts by mass.

In the polymerization reaction, a polymerization initiator is typically used. Any polymerization initiator can be used, so long as the desired composite polymer particles can be obtained. Examples of the polymerization initiator include sodium persulfate (NaPS), ammonium persulfate (APS), potassium persulfate (KPS), and the like. Among these, sodium persulfate and ammonium persulfate are preferred, with ammonium persulfate being more preferred. A reduction in the cycle characteristics of the resulting lithium-ion secondary battery can be inhibited by using ammonium persulfate or sodium persulfate as the polymerization initiator.

In the polymerization, a molecular weight modifier or a chain transfer agent may be included in the polymerization system. Examples of the molecular weight modifier or chain transfer agent include alkyl mercaptans such as n-hexyl mercaptan, n-octyl mercaptan, t-octyl mercaptan, n-dodecyl mercaptan, t-dodecyl mercaptan, and n-stearyl mercaptan; xanthogen compounds such as dimethylxanthogen disulfide and diisopropylxanthogen disulfide; terpinolene; thiuram compounds such as tetramethyl thiuram disulfide, tetraethyl thiuram disulfide, and tetramethyl thiuram monosulfide; phenol compounds such as 2,6-di-t-butyl-4-methylphenol and styrenated phenol; allylic compounds such as allyl alcohol; halogenated hydrocarbon compounds such as dichloromethane, dibromomethane, and carbon tetrabromide; and thioglycolic acid, thiomalic acid, 2-ethylhexyl thioglycolate, diphenylethylene, and α-methyl styrene dimer. One type of these may be used alone, or two or more types may be used in combination in any ratio.

(Characteristics of Binder Composition)

The initial adhesive force of the binder composition, which contains particles formed by the second component being located substantially on a portion of the outside of particles comprising the first component, is at least 1. As a result of the initial adhesive force of the binder composition being within the aforementioned range, the electrode active material layer can be held on the current collector without use of a binder other than the binder particles. On the other hand, if the initial adhesive force of the binder composition is too small, the binding force of the binder composition becomes insufficient. The initial adhesive force of the binder composition is the force measured at 25° C. by the initial adhesive force test prescribed by JIS Z0237 (inclination angle 20° C.).

The storage elastic modulus at 150° C. of the binder composition, which contains particles formed by the second component being located substantially on a portion of the outside of particles comprising the first component, is no greater than 1,000 Pa and preferably no greater than 100 Pa. Setting the storage elastic modulus at 150° C. of the binder composition within the aforementioned range can sufficiently increase the internal resistance during abnormal overheating. If the storage elastic modulus at 150° C. of the binder composition is too large, the binder composition does not sufficiently melt during abnormal overheating.

The storage elastic modulus at 150° C. of the binder composition can be calculated by the following measurement method. First, a 0.5 mm thick film is formed from the binder composition. An 8 mm diameter circle is punched out from the resulting film and used as a sample. Using an apparatus for measuring dynamic viscoelasticity (such as product name "MCR302" by Anton Paar), distortion at a frequency of 1 Hz is added to the sample, and the dynamic viscoelasticity is measured while raising the temperature in a range of 25° C. to 160° C. at a predetermined rate of temperature increase (such as 20° C./min). The storage elastic modulus can then be calculated on the basis of the measurement results.

(Electrode for Lithium Ion Secondary Battery-Use)

A binder composition containing particles formed by the second component being located substantially on a portion of the outside of particles comprising the first component is used in an electrode for lithium ion secondary battery-use of the present disclosure. The electrode for lithium ion secondary battery-use is obtained by forming an electrode active material layer on a current collector. The electrode active material layer includes an electrode active material and the aforementioned binder composition and also includes a thickener, conductive material, and the like used as necessary. The content of the binder composition in the electrode active material layer per 100 parts by mass of the electrode active material is normally at least 0.1 parts by mass and no greater than 20 parts by mass, preferably at least 0.2 parts by mass, more preferably at least 0.3 parts by mass, and preferably no greater than 15 parts by mass, more preferably no greater than 10 parts by mass.

The electrode active material layer is formed by applying a slurry composition, which includes the electrode active material and the binder composition, along with a thickener, conductive material, and the like used as necessary, onto a current collector and then drying the applied slurry composition.

The method for applying the slurry composition onto the current collector is not specifically limited. Examples include doctor blading, dip coating, reverse roll coating, direct roll coating, gravure coating, extrusion coating, comma direct coating, slide die coating, and brush coating. Examples of drying methods include drying by warm, hot, or low-humidity air; vacuum drying; or drying by irradiation with (far) infrared light, electron beams, or the like. The drying time is normally from 1 min to 60 min. The drying temperature is normally from 40° C. to 180° C. and is a lower temperature than the melting temperature of the first component. The electrode active material layer may be formed by repeating the application and drying of the slurry composition multiple times. The electrode active material layer may be further heated as necessary after being formed.

Here, the slurry composition can be obtained by mixing the electrode active material and the binder composition with the thickener, conductive material, and the like used as necessary and also with a solvent such as water.

The mixing method when preparing the slurry composition is not specifically limited. Examples include use of a stirring, shaking, or rotating mixing apparatus. Further examples include use of a dispersing kneading apparatus such as a homogenizer, ball mill, sand mill, roll mill, planetary mixer, or planetary kneader.

(Current Collector)

The material of the current collector may, for example, be metal, carbon, a conductive polymer, or the like. Metal is preferably used. Aluminum, platinum, nickel, tantalum, titanium, stainless steel, copper, or another alloy is normally used as the metal for the current collector. Among these, copper, aluminum, or an aluminum alloy is preferably used for its conductivity and voltage resistance.

The thickness of the current collector is preferably at least 5 μm and no greater than 100 μm, more preferably at least 8 μm and no greater than 70 μm, and even more preferably at least 10 μm and no greater than 50 μm.

(Electrode Active Material)

Examples of the electrode active material (positive electrode active material) when the electrode for lithium ion secondary battery-use is a positive electrode include a metal oxide capable of doping/dedoping lithium ions reversibly. Examples of such a metal oxide include lithium cobalt oxide, lithium nickel oxide, lithium manganate, and lithium iron phosphate. The aforementioned examples of positive electrode active material may be used individually, or a plurality thereof may be mixed and used, in accordance with the application.

Examples of the active material (negative electrode active material) of a negative electrode used as the counter electrode for the positive electrode of the lithium ion secondary battery include low-crystalline carbon (amorphous carbon) such as easily graphitizable carbon, non-graphitizable carbon, and pyrolytic carbon; graphite (natural graphite, artificial graphite); alloy materials of tin, silicon, and the like; and oxides such as silicon oxide, tin oxide, and lithium titanate. The aforementioned examples of negative electrode active material may be used individually, or a plurality thereof may be mixed and used, in accordance with the application.

The volume-average particle diameter of the electrode active material in the electrode for lithium ion secondary battery-use is normally at least 0.1 μm and no greater than 100 μm, preferably at least 0.5 μm and no greater than 50 μm, and more preferably at least 0.8 μm and no greater than 30 μm for both the positive electrode and the negative electrode.

(Conductive Material)

The electrode active material layer of the present disclosure may contain a conductive material as necessary. The conductive material is not specifically limited as long as it is a material with conductivity, but conductive particulate material is preferred. Examples of the conductive material include conductive carbon black such as furnace black, acetylene black, and Ketjen black; graphite such as natural graphite and artificial graphite; and carbon fiber such as polyacrylonitrile-based carbon fiber, pitch-based carbon fiber, and vapor grown carbon fiber. The volume-average particle diameter when the conductive material is a particulate material is not specifically limited but is preferably smaller than the volume-average particle diameter of the electrode active material. To achieve sufficient conductivity with a smaller amount, the volume-average particle diameter of the conductive material is preferably at least 0.001 μm and no greater than 10 μm, more preferably at least 0.05 μm and no greater than 5 μm, and even more preferably at least 0.1 μm and no greater than 1 μm.

(Thickener)

The electrode active material layer of the present disclosure may contain a thickener as necessary. Examples of the thickener include cellulosic polymers, such as carboxymethyl cellulose, methyl cellulose, and hydroxypropyl cellulose, and ammonium salts and alkali metal salts thereof; (modified) poly(meth)acrylic acid and ammonium salts and alkali metal salts thereof; polyvinyl alcohols such as (modified) polyvinyl alcohol, a copolymer of vinyl alcohol and acrylic acid or acrylate, or a copolymer of vinyl alcohol and maleic anhydride, maleic acid, or fumaric acid; and polyethylene glycol, polyethylene oxide, polyvinyl pyrrolidone, modified polyacrylic acid, starch oxide, starch phosphate, casein, various modified starches, acrylonitrile-butadiene copolymer hydride, and the like. Among these, ammonium salts and alkali metal salts of carboxymethyl cellulose and carboxymethyl cellulose are preferably used. In the present disclosure, "(modified) poly" refers to "unmodified poly" or "modified poly".

The content of the thickener in the electrode active material layer is preferably in a range that does not effect the cell characteristics. The content per 100 parts by mass of the electrode active material is preferably at least 0.1 parts by mass and no greater than 5 parts by mass, more preferably at least 0.2 parts by mass and no greater than 4 parts by mass, and even more preferably at least 0.3 parts by mass and no greater than 3 parts by mass.

(Lithium Ion Secondary Battery)

A lithium ion secondary battery can be produced using the electrode for lithium ion secondary battery-use of the present disclosure. For example, the lithium ion secondary battery uses the electrode for lithium ion secondary battery-use of the present disclosure as either or both of the positive electrode and the negative electrode and further includes a separator and an electrolysis solution.

When using the electrode for lithium ion secondary battery-use of the present disclosure in only one of the positive electrode and the negative electrode, a known electrode can be used for the other electrode.

A fine porous membrane or non-woven fabric containing a polyolefin resin, such as polyethylene or polypropylene, or an aromatic polyamide resin; a porous resin coat containing an inorganic ceramic powder; or the like can be used as the separator.

The heatproof temperature of the separator is preferably higher than the melting point of the first component in the binder particles used in the electrode.

To reduce the resistance due to the separator inside the lithium ion secondary battery and to achieve excellent workability when producing the lithium ion secondary battery, the thickness of the separator is preferably at least 0.5 µm and no greater than 40 µm, more preferably at least 1 µm and no greater than 30 µm, and even more preferably at least 1 µm and no greater than 25 µm.

(Electrolysis Solution)

The electrolysis solution is not specifically limited. For example, the result of dissolving a lithium salt as a supporting electrolyte in a nonaqueous solvent may be used. Examples of lithium salts include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. In particular, $LiPF_6$, $LiClO_4$, and $CF_3SO_3Li$, which readily dissolve in a solvent and exhibit a high degree of dissociation, are preferably used. One type of lithium salt may be used alone, or two or more types may be used in combination. The amount of supporting electrolyte is normally at least 1 mass %, preferably at least 5 mass %, and normally no greater than 30 mass %, preferably no greater than 20 mass %, relative to the electrolysis solution. Setting the amount of supporting electrolyte within the aforementioned range allows suppression of a phenomenon whereby the ion conductivity decreases causing the charge characteristics and discharge characteristics of the battery to degrade.

The solvent used in the electrolysis solution is not specifically limited, as long as it can dissolve the supporting electrolyte, but normally, the following are used: alkyl carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethylsulfoxide. In particular, dimethyl carbonate, ethylene carbonate, propylene carbonate, diethyl carbonate, and methyl ethyl carbonate are preferred for ease of obtaining high ion conductivity and for a wide operating temperature range. One type of solvent may be used alone, or two or more types may be used in combination. Furthermore, additives may be included for use in the electrolysis solution. Carbonate-based compounds such as vinylene carbonate (VC) are preferred as additives.

Examples of electrolysis solutions other than those listed above include a polymer electrolysis solution in gel form, in which a polymer electrolyte such as polyethylene oxide or polyacrylonitrile is saturated with an electrolysis solution, and an inorganic solid electrolyte such as lithium sulfide, LiI, $Li_3N$, $Li_2S$—$P_2S_5$ glass ceramic, and the like.

The lithium ion secondary battery can be obtained by stacking the negative electrode and the positive electrode with the separator therebetween, rolling or folding the resulting stack in accordance with the battery shape, placing the stack in a battery container, filling the battery container with the electrolysis solution, and sealing the battery container. A pressure increase inside the battery and overcharging/overdischarging can also be prevented by inserting an expanded metal; an overcurrent preventing device, such as a fuse or a PTC device; a lead plate; or the like as necessary. The shape of the battery may be a laminate cell, coin type, button type, sheet type, cylinder type, prismatic type, flat type, or the like.

EXAMPLES

The present disclosure is described below through examples, but the present disclosure is in no way limited to these examples. Unless otherwise indicated, "part(s)" and "%" in the examples refer to "parts by mass" and "mass %". Measurement and evaluation of properties and characteristics were performed in the following ways.

<Measurement of Melting Point>

The melting point of the particles comprising the first component used in the examples and comparative examples was measured as follows.

A differential scanning calorimeter (DSC 6220 SII, produced by NanoTechnology Inc.) was used. On the basis of JIS K7121 (1987), a sample (particles comprising the first component) was heated to a temperature at least 30° C. higher than the melting point, cooled at a cooling rate of −10° C./min to room temperature, and subsequently measured at a rate of temperature increase of 10° C./min.

<Measurement of Molecular Weight>

The number-average molecular weight of the polyolefin used in the examples and comparative examples was measured as follows.

First, 10 mg of a sample (polyolefin) was dissolved by adding 5 mL of solvent and stirring for 30 min at 140° C. to 150° C. Next, the solution was filtered using a 0.5 µm filter and taken as a measurement sample. This measurement sample was analyzed under the following conditions using gel permeation chromatography (GPC), and the number-average molecular weight was calculated from the analysis result.

Measurement apparatus: PL-220 (produced by Polymer Laboratories)

Columns: Shodex HT-G, HT-806M (one), HT-803 (one) (diameter 8.0 mm×30 cm, produced by Showa Denko K.K.)

Solvent: trichlorobenzene+0.1% BHT

Flow rate: 1.0 mL/min

Detector: differential refractive index detector RI

Column temperature: 145° C.

Reference material: monodisperse polystyrene (produced by Tosoh Corporation)

<Measurement of Glass-Transition Temperature>

To measure the glass-transition temperature of the second component, a polymer (measurement sample) having a similar composition to that of the second component was prepared and measured. Specifically, a polymer to constitute the measurement sample was prepared under similar polymerization conditions as the polymerization conditions for the second component using the monomer, leading to the second component, that was used in preparation of the second component. A differential scanning calorimeter (DSC 6220 SII, produced by NanoTechnology Inc.) was used to measure the glass-transition temperature of the measurement sample on the basis of JIS K7121 (1987). The result was taken as the glass-transition temperature of the second component.

<Measurement of Initial Adhesive Force>

The binder composition water dispersion prepared in the examples and comparative examples was applied and dried to form a 2 µm thick binder composition layer on a Corona treated PET film. This binder composition layer was taken as the measurement sample. On the basis of JIS Z0237, the aforementioned measurement sample was arranged in a 23° C. temperature environment at an inclination angle of 20° so that the binder composition layer became the surface layer, and 30 steel balls of varying diameters, from 1/32 inch to 32/32 inch, were rolled down at an initial velocity of zero from a position 10 cm up the inclined surface. The ball with the largest diameter that stopped on the binder composition layer was indicated by ball number and taken as the initial adhesive force.

<Measurement of Storage Elastic Modulus>

The binder composition water dispersion prepared in the examples and comparative examples was dried for 168 hours at a temperature of 23° C. to form a 0.5 mm thick film. An 8 mm diameter circle was punched out and taken as the measurement sample. Using the following apparatus, the dynamic viscoelasticity was measured under the following conditions. The storage elastic modulus was calculated on the basis of the measurement result.

Apparatus: Rheometer MCR302 (produced by Anton Paar)

Set temperature range: 25° C. to 160° C.

Set rate of temperature increase: 20° C./min

Measurement frequency: 1 Hz

<Binding Capacity>

The positive electrode produced in the examples and comparative examples was cut into rectangular test specimens 100 mm long by 10 mm wide. With the surface on the electrode active material layer side facing down, cellophane tape (prescribed by JIS Z1522) was adhered to the electrode active material layer surface, and the stress when one edge of the current collector was peeled vertically at a tension rate of 50 mm/min was measured (the cellophane tape was affixed to a test stage). This measurement was performed three times, and the average value was calculated as the peel strength and judged by the following criteria. A larger value indicates better binding capacity of the electrode active material layer.

A: Peel strength of at least 12 N/m
B: Peel strength of at least 8 N/m and less than 12 N/m
C: Peel strength of at least 4 N/m and less than 8 N/m
D: Peel strength of less than 4 N/m, or binding capacity low enough to make measurement difficult <Resistance Increase During Abnormal Overheating>

The lithium ion secondary battery prepared in the examples and comparative examples was charged to 50% of the charging depth (SOC) at 1 C (C being a value expressed as a rated capacity (mA)/1 hour) in a 25° C. temperature environment and was then charged for 10 seconds and discharged for 10 seconds at each of 0.5 C, 1.0 C, 1.5 C, and 2.0 C, centering on 50% of the SOC. The battery voltage after 10 seconds on the discharging side was plotted against the current, and the gradient was calculated as the IV resistance (Ω) (discharging IV resistance). Furthermore, the value yielded by {[IV resistance of lithium ion secondary battery using a positive electrode with 160° C. heating (A3)]/[IV resistance of lithium ion secondary battery using a positive electrode without 160° C. heating (A2)]}×100(%) was taken as the IV resistance increase rate and evaluated by the following criteria. A higher value indicates a better resistance increase during abnormal overheating.

A: IV resistance increase rate of at least 400%
B: IV resistance increase rate of at least 300% and less than 400%
C: IV resistance increase rate of at least 200% and less than 300%
D: IV resistance increase rate of less than 200%

Example 1

<Preparation of Binder Composition (A1) Water Dispersion>

To a polymerization can A, 100 parts of deionized water and 100 parts in terms of solid content of a 30% aqueous emulsion of a polyolefin (polyethylene-based wax, melting point of 95° C., number-average molecular weight of 7,300) as the first component were added, 0.2 parts of ammonium persulfate as a polymerization initiator and 10 parts of deionized water were further added, and the result was heated to 70° C. To a separate polymerization can B, 30 parts of deionized water, 35 parts of 2-ethylhexyl acrylate (hereinafter also simply "2-EHA") as a monomer leading to the second component, and 15 parts of styrene (hereinafter also simply "St") were added, and 0.5 parts of ethylene glycol dimethacrylate and 2 parts in terms of solid content of a 20% aqueous solution of polyoxyalkylene alkenyl ether ammonium sulfate were further added. The result was thoroughly stirred and then added continuously to the polymerization can A over 120 min. Furthermore, while maintaining the temperature at 70° C., the polymerization reaction was continued until the polymerization conversion rate reached 98%. The reaction was quenched by cooling to yield a water dispersion of the binder composition (A1).

The glass-transition temperature of the second component in the resultant binder composition (A1) was −37° C. The initial adhesive force of the binder composition (A1) was 1, and the storage elastic modulus at 150° C. was 70 Pa. In the binder particles within the resulting binder composition, the second component was located substantially on a portion of the outside of particles comprising the first component.

<Production of Positive Electrodes for Lithium Ion Secondary Battery-Use (Positive Electrode (A2) and Positive Electrode with 160° C. Heating (A3))>

Lithium cobalt oxide ($LiCoO_2$; number-average particle diameter: 20 µm) as a positive electrode active material, acetylene black as a conductive material, an aqueous solution of sodium salt of carboxymethyl cellulose as a thickener, and a binder composition as a binder were mixed at a mass ratio in terms of solid content of 100:2:1:3 between the positive electrode active material, conductive material, thickener, and binder to produce a slurry composition for a positive electrode. The slurry composition for a positive electrode was applied onto aluminum foil as a current collector and subsequently dried first at 60° C. and then at 80° C. A roller was then used to roll the current collector, and a positive electrode (A2) was produced by attaching a current collector tab. The binding capacity of this positive electrode was evaluated. The results are listed in Table 1.

Furthermore, a portion of the positive electrode was heated for 5 min at 160° C. in a vacuum environment to produce a positive electrode with 160° C. heating (A3).

<Production of Negative Electrode for Lithium Ion Secondary Battery-Use>

Artificial graphite (volume-average particle diameter: 25 μm) as a negative electrode active material, an aqueous solution of sodium salt of carboxymethyl cellulose as a thickener, and a water dispersion of a styrene-butadiene copolymer as a binder were mixed at a mass ratio in terms of solid content of 100:2:2 between the negative electrode active material, thickener, and binder to produce a negative electrode slurry. The negative electrode slurry was applied onto copper foil as a current collector and subsequently dried first at 60° C. and then at 120° C. A roller was then used to roll the current collector, and a negative electrode was produced by attaching a current collector tab.

<Preparation of Electrolysis Solution>

An electrolysis solution was prepared by mixing ethylene carbonate and diethyl carbonate in a 1:2 mass ratio to form a solvent, into which $LiPF_6$ was dissolved as a solute to become 1.0 M.

<Production of Lithium Ion Secondary Battery>

The produced positive electrode for lithium ion secondary battery-use and negative electrode for lithium ion secondary battery-use were wound into a roll to oppose each other with a polyethylene separator therebetween, and the roll was compressed from one direction. The compressed roll was oval in plan view. The compressed roll was enclosed in a predetermined aluminum laminated case along with electrolysis solution to produce a lithium ion secondary battery with a rated capacity of 720 mAh. As positive electrodes for lithium ion secondary battery-use, both the positive electrode (A2) and the positive electrode with 160° C. heating (A3) were used to prepare lithium ion secondary batteries, and the resistance increase during abnormal overheating was evaluated. The results are listed in Table 1.

Example 2

The binder composition (A1) water dispersion was prepared in a way similar to Example 1, except that the type of first component used in the preparation of the binder composition (A1) water dispersion was changed to polyethylene-based wax (melting point 130° C., molecular weight 9,900). The initial adhesive force of the resulting binder composition (A1) was 1, and the storage elastic modulus at 150° C. was 80 Pa. Apart from using the binder composition obtained as described above, positive electrodes for lithium ion secondary battery-use (positive electrode (A2) and positive electrode with 160° C. heating (A3)), a negative electrode for lithium ion secondary battery-use, an electrolysis solution, and a lithium ion secondary battery were produced in a way similar to Example 1. The evaluations were then performed in the same manner as for Example 1. The results are listed in Table 1.

Example 3

The binder composition (A1) water dispersion was prepared in a way similar to Example 1, except for using 35 parts of n-butyl acrylate (hereinafter also simply "BA") and 15 parts of acrylonitrile (hereinafter also simply "AN") as the monomer leading to the second component used in preparation of the binder composition (A1) water dispersion. The glass-transition temperature of the second component in the resultant binder composition (A1) was −20° C. The initial adhesive force of the binder composition (A1) was 1, and the storage elastic modulus at 150° C. was 70 Pa. Apart from using the binder composition obtained as described above, positive electrodes for lithium ion secondary battery-use (positive electrode (A2) and positive electrode with 160° C. heating (A3)), a negative electrode for lithium ion secondary battery-use, an electrolysis solution, and a lithium ion secondary battery were produced in a way similar to Example 1. The evaluations were then performed in the same manner as for Example 1. The results are listed in Table 1.

Comparative Example 1

Without adding the second component, 100 parts of deionized water and 100 parts in terms of solid content of a 30% aqueous emulsion of polyethylene-based wax (melting point of 95° C., number-average molecular weight of 7,300) as the first component were added, and the result was taken as the binder composition (A1) water dispersion. The initial adhesive force of the resulting binder composition (A1) was 0, and the storage elastic modulus at 150° C. was 70 Pa. In the binder particles within the resulting binder composition, the second component did not completely cover, nor was located substantially on a portion of, the outside of particles comprising the first component.

Positive electrodes for lithium ion secondary battery-use (positive electrode (A2) and positive electrode with 160° C. heating (A3)) were produced in a way similar to Example 1 using the binder composition obtained as described above, but the binding capacity of the binder composition (A1) was insufficient. A positive electrode that was sufficiently strong for evaluating the binding capacity and for producing a lithium ion secondary battery could not be obtained.

Comparative Example 2

The binder composition (A1) water dispersion was prepared in a way similar to Example 1, except for using 70 parts of 2-EHA and 30 parts of St as the monomer leading to the second component used in preparation of the binder composition (A1) water dispersion. The glass-transition temperature of the second component in the resultant binder composition (A1) was −37° C. The initial adhesive force of the binder composition (A1) was 1, and the storage elastic modulus at 150° C. was 70,000 Pa. In the binder particles within the resulting binder composition, the second component completely covered the outside of particles comprising the first component.

Apart from using the binder composition obtained as described above, positive electrodes for lithium ion secondary battery-use (positive electrode (A2) and positive electrode with 160° C. heating (A3)), a negative electrode for lithium ion secondary battery-use, an electrolysis solution, and a lithium ion secondary battery were produced in a way similar to Example 1. The evaluations were then performed in the same manner as for Example 1. The results are listed in Table 1.

TABLE 1

|  |  |  | Example 1 | Example 2 | Example 3 | Comparative Example 1 | Comparative Example 2 |
|---|---|---|---|---|---|---|---|
| Binder composition | First component | Melting point | 95° C. | 130° C. | 95° C. | 95° C. | 95° C. |
|  |  | Molecular weight of polyolefin | 7,300 | 9,900 | 7,300 | 7,300 | 7,300 |
|  |  | Charge amount | 100 parts | 100 parts | 100 parts | 100 parts | 100 parts |
|  | Second component | Glass transition temperature | −37° C. | −37° C. | −20° C. | No second component | −37° C. |
|  |  | Charge amount | 2-EHA = 35 parts St = 15 parts | 2-EHA = 35 parts St = 15 parts | BA = 35 parts AN = 15 parts |  | 2-EHA = 70 parts St = 30 parts |
|  | Initial adhesive force JIS Z0237 |  | 1 | 1 | 1 | 0 | 1 |
|  | Storage elastic modulus at 150° C. |  | 70 Pa | 80 Pa | 70 Pa | 70 Pa | 70,000 Pa |
| Evaluation items | Binding capacity (peel strength) |  | A | A | B | D | A |
|  | Resistance increase during abnormal overheating (IV resistance increase rate) |  | A | A | A | — | D |

As is clear from Table 1, the binding capacity was good in an electrode for lithium ion secondary battery-use that includes a binder composition containing particles formed by the second component being located substantially on a portion of the outside of particles comprising the first component, where the initial adhesive force of the binder composition is at least 1 and the storage elastic modulus of the binder composition at 150° C. is no greater than 1,000 Pa. The resistance increase during abnormal overheating of a lithium ion secondary battery using this electrode was also good.

The invention claimed is:

1. An electrode for lithium ion secondary battery-use comprising:
   a binder composition containing particles formed by a second component being located substantially on a portion of an outside of particles comprising a first component; wherein
   an initial adhesive force of the binder composition is at least 1, and
   a storage elastic modulus of the binder composition at 150° C. is no greater than 1,000 Pa.

2. The electrode for lithium ion secondary battery-use of claim 1, wherein a glass-transition temperature of the second component is at least −60° C. and no higher than 20° C.

3. The electrode for lithium ion secondary battery-use of claim 1, wherein a melting point of the first component is at least 60° C. and no higher than 160° C.

4. The electrode for lithium ion secondary battery-use of claim 1, wherein the first component contains a polyolefin with a number-average molecular weight of at least 5,000 and no greater than 15,000.

5. A lithium ion secondary battery comprising:
   a positive electrode, a negative electrode, a separator, and an electrolysis solution; wherein
   either or both of the positive electrode and the negative electrode are the electrode for lithium ion secondary battery-use of claim 1.

* * * * *